United States Patent

Kajitani et al.

[11] Patent Number: 5,130,626
[45] Date of Patent: Jul. 14, 1992

[54] DEVICE FOR CONTROLLING ROTATIONAL SPEED OF MOTOR

[75] Inventors: Tetsuji Kajitani, Kawanishi; Harada Hiroyuki, Sakai, both of Japan

[73] Assignee: Mita Industrial Co., Ltd., Japan

[21] Appl. No.: 619,617

[22] Filed: Nov. 29, 1990

[30] Foreign Application Priority Data

Nov. 30, 1989 [JP] Japan .................................. 1-311218
Jan. 18, 1990 [JP] Japan .................................. 2-10056

[51] Int. Cl.$^5$ ............................................. G05B 1/02
[52] U.S. Cl. ................................. 318/608; 318/606; 318/599; 318/811; 388/813
[58] Field of Search ............... 318/560, 599, 603, 606, 318/608, 809, 811; 388/811, 812, 813, 820, 912

[56] References Cited

U.S. PATENT DOCUMENTS

| | | | |
|---|---|---|---|
| 4,599,545 | 7/1986 | Moriki et al. | 318/599 |
| 4,639,649 | 1/1987 | Seto | 318/813 |
| 4,902,949 | 2/1990 | Hirata | 318/608 |
| 4,933,985 | 6/1990 | Fukushima | 318/608 |
| 4,950,968 | 8/1990 | Ogura | 318/599 |

Primary Examiner—William M. Shoop, Jr.
Assistant Examiner—John W. Cabeca
Attorney, Agent, or Firm—Beveridge, DeGrandi & Weilacher

[57] ABSTRACT

A device for controlling the rotational speed of a motor carries out feedback control by a speed difference control signal and a phase difference control signal. A first time period from a reference time point to a time when a newest detection pulse is outputted is calculated every time a predetermined number of detection pulses are counted by detection pulse counters. A second time period from the reference time point to the time when a command pulse, which is assigned an ordinal number equal to the ordinal number of the newest detection pulse and which thereby corresponds to the newest detection pulse, is calculated on the basis of the total number of pulses counted by the detection pulse counters in the time period from the reference time point to the time when the newest detection pulse is outputted, and the period of the command pulse. The phase difference between the newest detection pulse and the command pulse corresponding thereto is calculated on the basis of the first time period and the second time period and the period of the command pulse. A phase difference control signal proportional to the phase difference calculated is thus determined.

3 Claims, 8 Drawing Sheets

D: CALCULATED PHASE DIFFERENCE
C: ACTUAL PHASE DIFFERENCE

DEVICE FOR CONTROLLING ROTATIONAL SPEED OF MOTOR

BACKGROUND OF THE INVENTION

1. Field of the Invention

The present invention relates to a device for controlling the rotational speed of a motor.

2. Description of the Prior Art

For example, in a control device of a servomotor for driving an optical system of a document reader such as an electrophotographic copying machine, even if the load on the motor fluctuates by the change in frictional resistance or the like as the optical system is moved, the optical system must be moved at constant speed by adjusting a motor control voltage with the fluctuations being rapidly followed to keep the speed of the servomotor constant.

Such proportional control has been conventionally carried out that a control signal is obtained by a voltage proportional to the difference between the command speed and the actually detected speed in order to keep the speed of a servomotor constant.

However, the conventional proportional control has the disadvantage in that the detected speed does not rapidly follow the command speed because it takes long for the speed to reach the command speed when the detected speed diviates from the command speed.

The applicant of the present application has developed a device capable of controlling a motor with the motor rapidly following the command speed by finding the difference between the command speed and the detected speed as well as finding the phase difference between a command speed signal and a detected speed signal and correcting a proportional control signal obtained by the difference in speed by a component of the phase difference, to apply for a patent (U.S. patent application Ser. No. 07/550,722).

In the above described device developed by the applicant of the present application, the phase difference is detected in, for example, the following manner.

More specifically, the leading edge of a speed command pulse is detected, and a time period T1 from a predetermined reference time point to the time when the leading edge of the pulse is detected is calculated and stored for each detection of the leading edge. On the other hand, the leading edge of a speed detection pulse is detected, and a time period T2 from the reference time point to the time when the leading edge of the pulse is detected is calculated and stored for each detection of the leading edge.

The difference between T1 and T2 stored at that time is calculated for each predetermined comparison timing, and the result of the calculation (T1-T2) is divided by the period of the speed command pulse to find the phase difference between the speed detection pulse and the speed command pulse.

With this method, the time period T1 from the reference time point to the time when the leading edge of the speed command pulse is detected is updated for each detection of the leading edge of the pulse, and the time period T2 from the reference time point to the time when the leading edge of the speed detection pulse is detected is updated for each detection of the leading edge of the pulse, to calculate the difference between T1 and T2 for each comparison timing. Accordingly, even when the phase difference between the speed command pulse and the speed detection pulse exceeds one period of the speed command pulse, the result of the calculation (T1-T2) becomes a value within one period.

Figure 10:
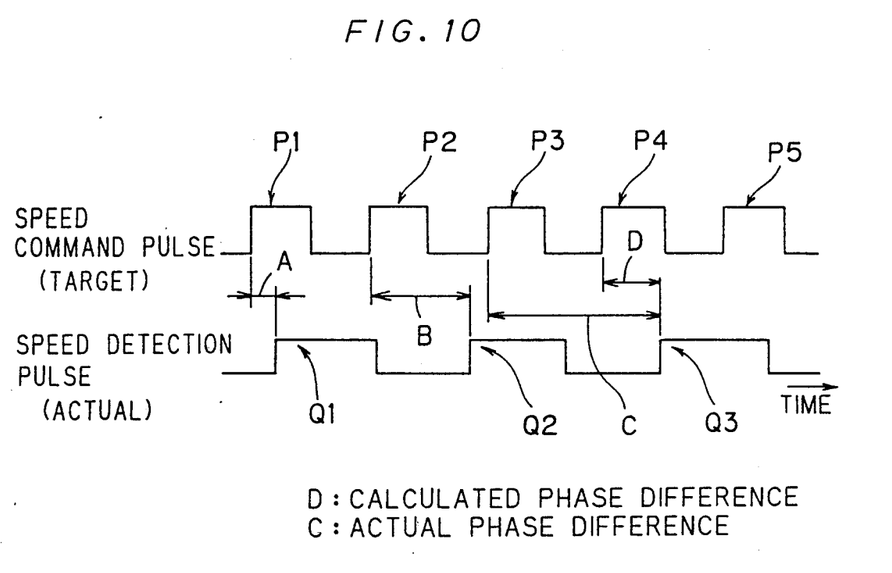
FIG. 10 is a timing chart for explaining the subject in the detection of the phase difference.

The foregoing will be described more concretely with reference to FIG. 10. The phase of the speed detection pulse is, for example, delayed. At this time, in a case where a delay phase (phase difference) of the speed detection pulse relative to the speed command pulse is within one period of the speed command pulse (A or B in FIG. 10), the leading edge of a speed command pulse P1 (or P2) is detected and the leading edge of a speed detection pulse Q1 (or Q2) corresponding thereto is detected with a little delay. Accordingly, the phase difference A (or B) is calculated on the basis of the corresponding pulses P1 and Q1 (or pulses P2 and Q2) to be compared.

However, when the phase difference exceeds one period of the speed command pulse, the leading edge of, for example, a speed command pulse P3 is detected and the leading edge of a speed command pulse P4 subsequent to the speed command pulse P3 is detected before the leading edge of a speed detection pulse Q3 corresponding to the speed command pulse P3 is detected. In such a case, a phase difference D is calculated on the basis of not the corresponding pulses P3 and Q3 but the pulses P4 and Q3. Accordingly, there arises the situations where an actual phase difference C based on the corresponding pulses P3 and Q3 is not calculated.

Such situations prevent the rotational speed of the motor from being accurately controlled.

SUMMARY OF THE INVENTION

Therefore, an object of the present invention is to provide a device for controlling the rotational speed of a motor which can accurately detect the actual phase difference even when the phase difference between a speed command pulse and a speed detection pulse exceeds one period of the speed command pulse to control the rotational speed of the motor with the motor rapidly following the command speed.

According to the present invention, a time period from a predetermined reference time point to the time when the newest speed detection pulse is outputted is calculated every time a predetermined number of, for example, one speed detection pulse proportional to the rotational speed of a motor is outputted.

Furthermore, a time period from the reference time point to the time when a speed command pulse corresponding to the newest speed detection pulse is outputted is calculated on the basis of the number of speed detection pulses outputted in the time period from the reference time point to the time when the speed command pulse is outputted and the period of the speed command pulse.

The phase difference between the speed detection pulse and the speed command pulse is accurately found on the basis of the calculated time period from the reference time point to the time when the newest speed detection pulse is outputted, the time period from the reference time point to the time when the speed command pulse corresponding to the newest speed detection pulse is outputted and the period of the speed command pulse.

If the phase difference accurately found in the above described manner is within a predetermined range, a phase difference control signal proportional to the phase difference is outputted. On the other hand, if the phase difference is outside the predetermined range, a control signal in the critical state, that is, a maximum control signal or a minimum control signal continues to be outputted.

The foregoing and other objects, features, aspects and advantages of the present invention will become more apparent from the following detailed description of the present invention when taken in conjuction with the accompanying drawings.

DESCRIPTION OF THE PREFERRED EMBODIMENTS

Description is now made, as one embodiment of the present invention, of a case where the present invention is applied to a driving control circuit of a DC servomotor for driving an optical system (a lighting unit and a reflecting mirror) of an electrophotographic copying machine by way of example.

Figure 1:
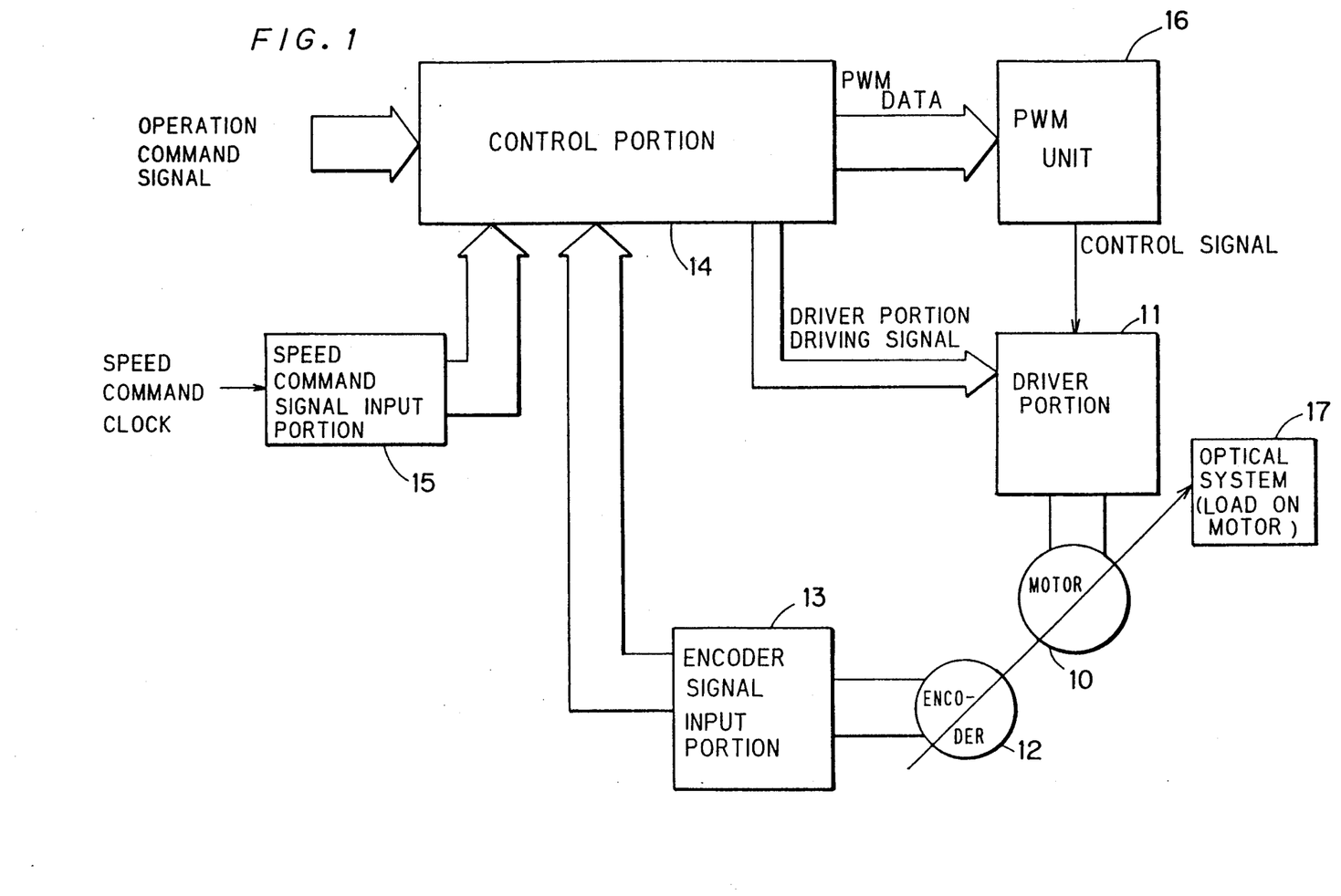
FIG. 1 is a block diagram showing the electrical construction of a driving control circuit of a DC servomotor for driving an optical system to which an embodiment of the present invention is applied.

FIG. 1 is a block diagram showing an example of the construction of a control circuit of a DC servomotor for driving an optical system of an electrophotographic copying machine. This control circuit uses a PWM (pulse width modulation) signal as a voltage applied to the DC servomotor.

This DC servomotor 10 is of a permanent magnet field type, which is driven by a driver portion 11 to move an optical system 17.

A rotary encoder 12 is connected to the axis of rotation of the servomotor 10. The rotary encoder 12 outputs a speed detection pulse every time the servomotor 10 is rotated through a predetermined very small angle, as has been already known. A-phase and B-phase speed detection pulses (speed detection signals) which have the same period and are shifted in phase by 90° are outputted from the rotary encoder 12 according to the present embodiment. Speed detection pulses in the respective phases, for example, 200 speed detection pulses are outputted from the rotary encoder 12 by one rotation of the servomotor 10.

Meanwhile, the rotary encoder 12 may be replaced with other equipments for outputting signals which are periodically changed in synchronism with the rotation of the servomotor 10.

The speed detection pulse outputted from the rotary encoder 12 is applied to an encoder signal input portion 13. The encoder signal input portion 13 is a circuit for detecting the rotational speed of the servomotor 10 on the basis of the speed detection pulse applied from the rotary encoder 12, as described in detail later. An output of the encoder signal input portion 13 is applied to a control portion 14.

The control portion 14 comprises a CPU, a ROM having a program or the like stored therein, a RAM for storing necessary data, and the like and performs processing such as calculation processing of the difference between the command speed and the detected speed, calculation processing of the phase difference between a speed command signal and a speed detection signal and calculation processing of PWM data for controlling the servomotor 10.

An operation command signal and a speed command signal (speed command clock) are applied to the control portion 14 from a control portion (not shown) of the main body of the electrophotographic copying machine. The speed command clock is subjected to signal processing in a speed command signal input portion 15 and then, applied to the control portion 14.

A PWM unit 16 is a unit for generating a PWM signal having a pulse width (output duty) corresponding to the PWM data applied from the control portion 14. The rotational speed of the servomotor 10 is controlled by the PWM signal outputted from the PWM unit 16.

The driver portion 11 determines the direction of rotation of the servomotor 10 or brakes the servomotor 10 on the basis of a driver portion driving signal applied from the control portion 14.

In order to rotate the servomotor 10 at desired command speed, it is necessary that the rotational speed of the servomotor 10 has been accurately detected. Accordingly, this control circuit is so adapted that it can accurately detect the speed of the servomotor 10 by constructing the encoder signal input portion 13 as shown in FIG. 2 and devising reading of signals by the control portion 14.

Figure 2:
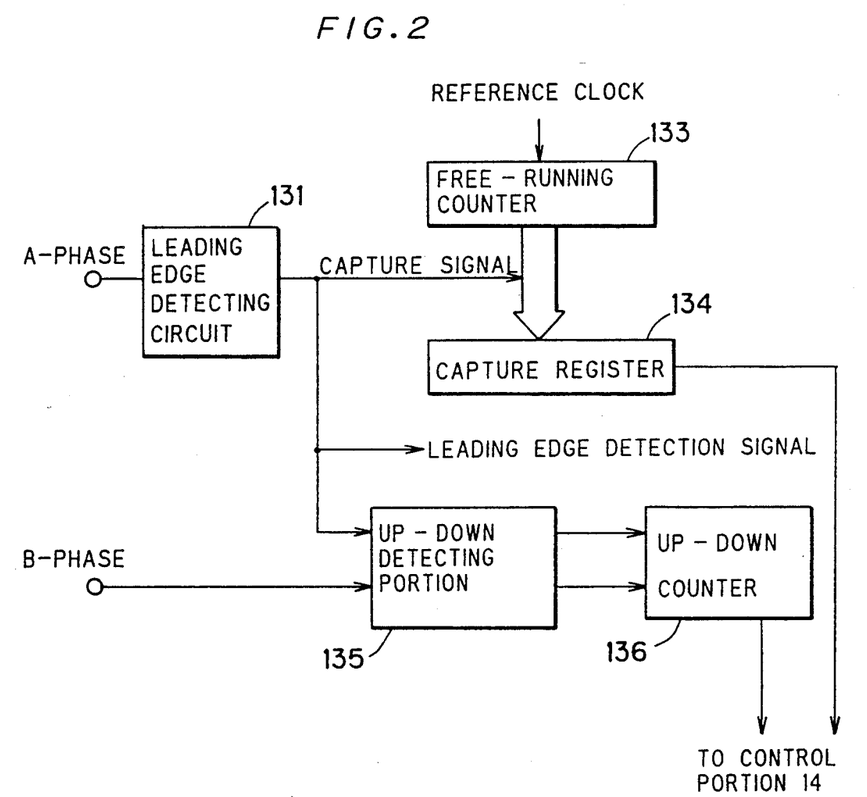
FIG. 2 is a circuit block diagram showing the electrical construction of a device for detecting the rotational speed of the DC servomotor for driving an optical system according to the embodiment of the present invention.

Referring to FIG. 2, the encoder signal input portion 13 comprises a leading edge detecting circuit 131 for detecting the leading edge of the A-phase speed detection pulse sent from the rotary encoder 12, a free-running counter 133 of, for example, 16-bit construction for counting reference clocks up, and a capture register 134 for reading and holding a count number in the free-running counter 133 by using as a capture signal a leading edge detection output of the leading edge detecting circuit 131 and using as a trigger the capture signal. The reference clock is a clock to be a basis of operation timing of the whole circuit shown in FIG. 1. If the circuit is constituted by a microcomputer, a machine clock is utilized. In addition, if there is no such reference clock, a reference clock generating circuit may be provided.

The encoder signal input portion 13 further comprises an up-down detecting portion 135 and an up-down counter 136. The up-down detecting portion 135 judges the level of the B-phase rotating pulse when the leading edge detection output of the A-phase speed detection pulse is applied from the leading edge detecting circuit 131 to determine whether the servomotor 10

(see FIG. 1) is rotated in the forward direction or the reverse direction depending on whether the B-phase rotating pulse is at a high level or a low level. The up-down counter 136 counts the detection output of the leading edge detecting circuit 131 up or down on the basis of a determination output of the up-down detecting portion 135.

Description is now made of the operation of the circuit shown in FIG. 2.

The contents of the capture register 134 are updated every time a capture signal, that is, the leading edge of an A-phase speed detection pulse is detected. In addition, the up-down counter 136 counts the number of times of detection of the leading edge of the speed detection pulse, that is, the number of speed detection pulses.

Therefore, if the up-down counter 136 counts a count number of reference clocks counted by the free-running counter 133 while counting n speed detection pulses within a predetermined sampling time period $\Delta T$, the number of revolutions N can be calculated on the basis of the count number.

More specifically, let f[Hz] be the frequency of a reference clock, let C[ppr] be the number of A-phase speed detection pulses outputted from the rotary encoder 12 by one rotation of the servomotor 10, let $CPT_n$ be the present contents of the capture register 131, let $CPT_{n-1}$ be the preceding contents of the capture register 131, and let n be the number of speed detection pulses. In this case, the number of revolutions N[rpm] of the servomotor 10 can be calculated by the following equation:

$$N = \frac{n}{\frac{(CPT_n - CPT_{n-1})}{f} \times C} \times 60 \quad (1)$$

Since the frequency f of the reference clock and the number C of the speed detection pulses are constants, the equation (1) is as follows:

$$N = \frac{nA}{CPT_n - CPT_{n-1}} = \frac{nA}{X} \quad (2)$$

where $A: f/c \times 60$ $X: CPT_n - CPT_{n-1}$

Figure 3:
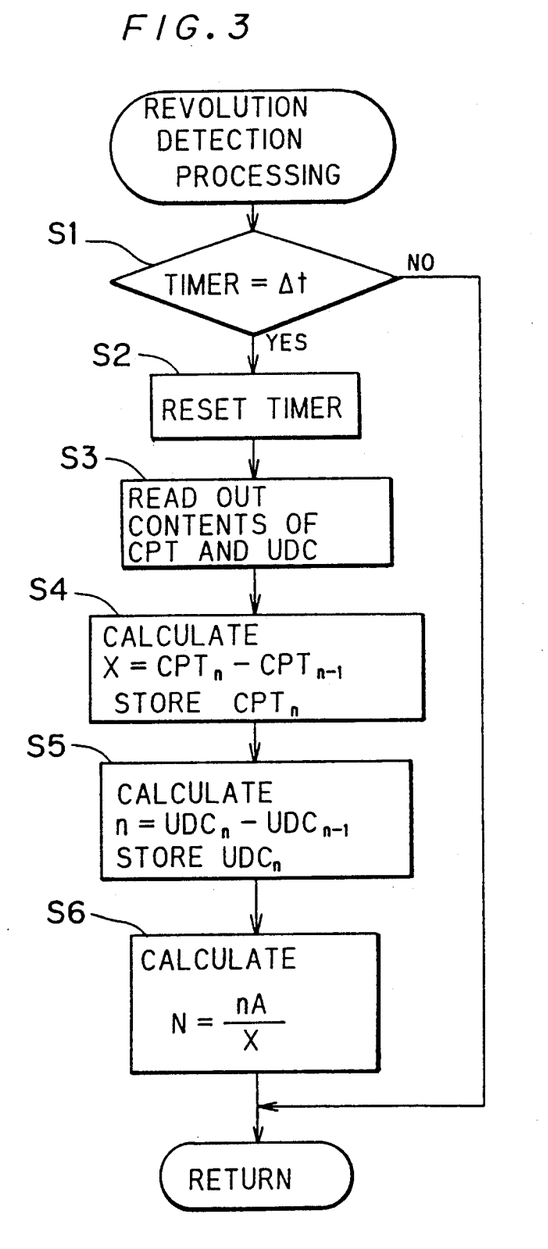
FIG. 3 is a flow chart showing the procedure of processing for detecting the number of revolutions in the embodiment of the present invention.

FIG. 3 shows the procedure of revolution detection processing for a control portion 14 reading out the contents of the capture register 134 and the up-down counter 136 for each sampling time period $\Delta t$ to calculate the number or revolutions N.

The sampling time period $\Delta t$ is set to a suitable time period satisfying the following expression:

$$\Delta t \geq X = CPT_n - CPT_{n-1} \quad (3)$$

Description is now made with reference to FIGS. 2 and 3.

In the control portion 14, every time an inner timer reaches a constant sampling time period $\Delta t$ (step S1), the timer is reset (step S2). The contents of the capture register 134 and the up-down counter 136 are read out (step S3).

Then, a count number $CPT_{n-1}$ (n is a natural number, which is increased for each calculation timing, for example, 1, 2, 3, . . .) read out the last time in the capture register 134 which has been already stored is subtracted from a count number $CPT_n$ read out this time in the capture register 134, to find the number X of reference clocks within one sampling time period $\Delta t$ and then, the count number $CPT_n$ is stored (step S4).

Furthermore, a count number $UDC_{n-1}$ (n is a natural number, which is increased for each calculation timing, for example, 1, 2, 3, . . .) read out the last time in the up-down counter 136 which has been already stored is subtracted from a count number $UDC_n$ read out this time in the up-down counter 136, to find the number n of speed detection pulses within one sampling time period $\Delta t$ and then, the count number $UDC_n$ is stored (step S5).

Thereafter, the number of revolutions N calculated in the present sampling timing is found on the basis of the above described equation (2) (step S6).

Figure 4:
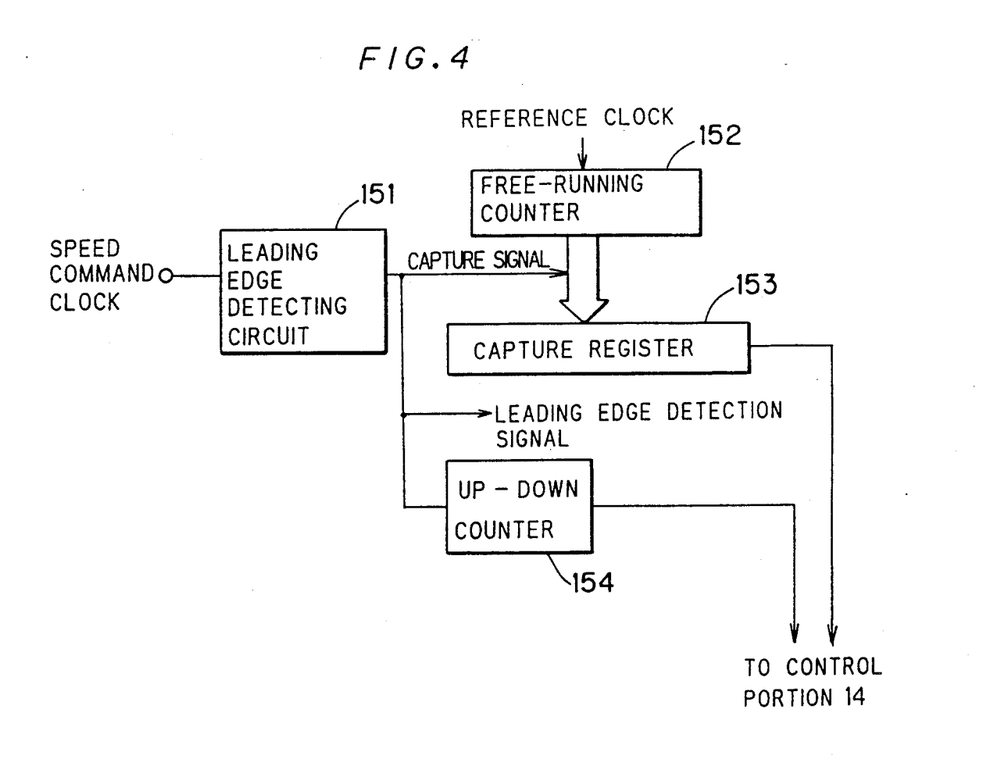
FIG. 4 is a block diagram showing an example of the specific construction of a speed command signal input portion.

The speed command signal input portion 15 will be described in detail.

FIG. 4 is a block diagram showing an example of the specific construction of the speed command signal input portion 15. The speed command signal input portion 15 comprises a leading edge detecting circuit 151 for detecting the leading edge, for example, of a speed command clock, a free-running counter 152, a capture register 153, and an up-down counter 154.

The free-running counter 152 is a counter of, for example, 16-bit construction for counting reference clocks applied up. The free-running counter 133 in the above described encoder signal input portion 13 may be also used as this free-running counter 152.

The capture register 153 is used for reading and holding a count number in the free-running counter 152 by using as a capture signal a leading edge detection output of the leading edge detecting circuit 151 and using as a trigger the capture signal.

The up-down counter 154 is used for counting output pulses of the leading edge detecting circuit 151 up.

The operation of this circuit is as follows.

A speed command clock outputted from a microcomputer on the side of the main body of the device, for example, on the side of control of the main body of the electrophotographic copying machine is applied to the leading edge detecting circuit 151, and the leading edge of the speed command clock is detected in the leading edge detecting circuit 151. Since an output of the leading edge detecting circuit 151 is applied to the free-running counter 152 as a capture signal, the contents of the capture register 153 are updated in response to the leading edge of the speed command clock. Accordingly, if the contents of the capture register 153 are read out on the basis of a given leading edge detection signal and the contents of the capture register 153 are read out on the basis of the next leading edge detection signal to find the difference therebetween, a count number in one period of the speed command clock in the free-running counter 152 can be counted and the number of revolutions $N_O$ to be the command speed can be calculated on the basis of the count number.

The present embodiment employs not a method of finding a count number corresponding to the difference between a count number after updating and a count number before updating every time the contents of the capture register 153 are updated but the same reading method as the method of reading out the count number in the capture register 134 in the encoder signal input portion 13 so as to further improve detecting precision.

More specifically, in the control portion 14, the contents of the capture register 153 and the contents of the up-down counter 154 are read out for each predetermined sampling time period Δt, and the difference between the count number read out this time and the count number read out the last time in the capture register 153 is found. The difference therebetween is divided by the difference between the count number read out this time and the count number read out the last time in the up-down counter 154, to find the exact number of reference clocks within one period of the speed command clock.

Figure 5:
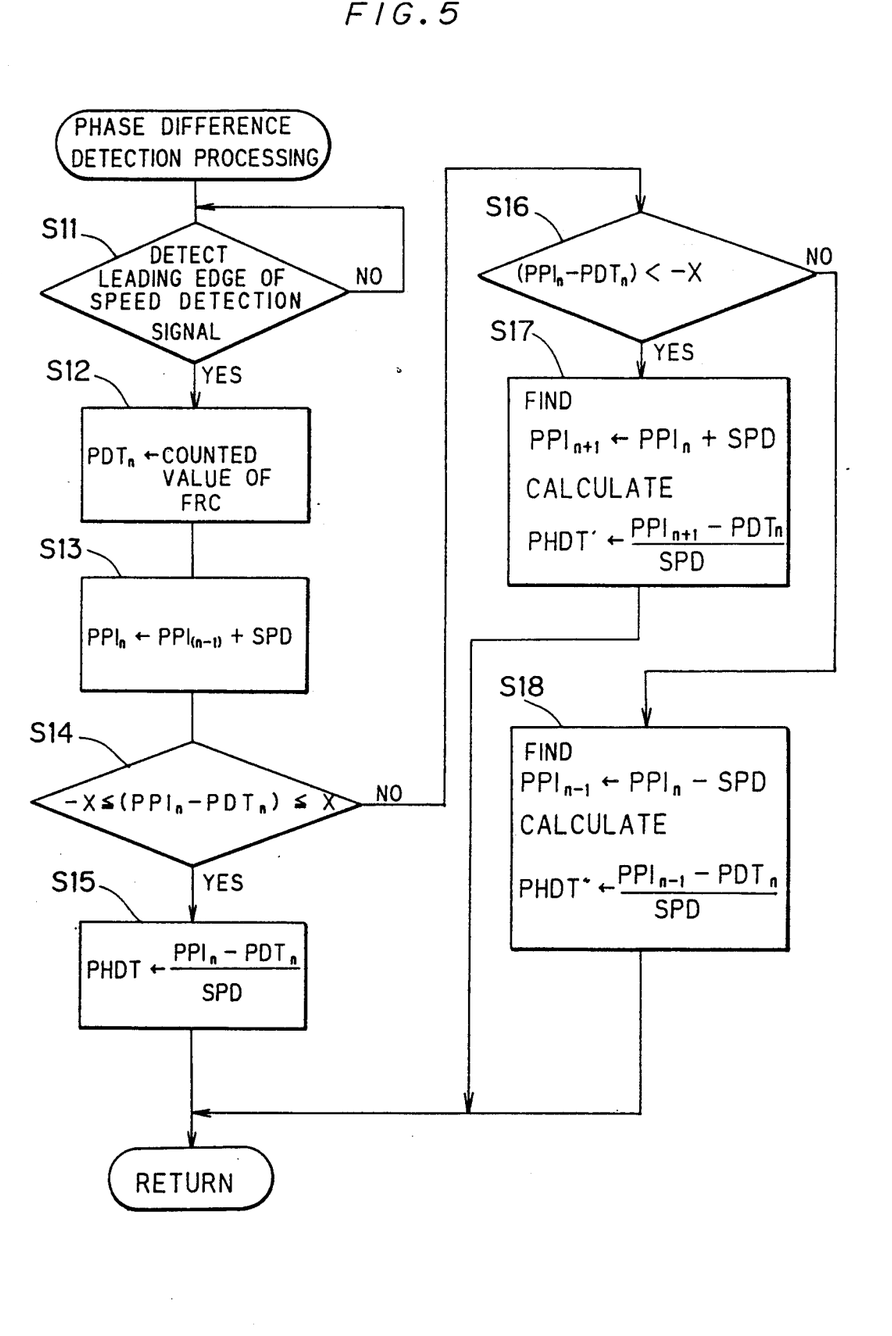
FIG. 5 is a flow chart showing the procedure of processing for detecting the phase difference in the embodiment of the present invention.

FIG. 5 shows the procedure of processing for the control portion 14 calculating the phase difference between the speed command clock and the speed detection pulse.

First, when the leading edge of the speed detection pulse is detected by the leading edge detecting circuit 131 in the encoder signal input portion 13 (step S11), a count value in the free-running counter 133 is read and the value is stored as a phase comparison value $PDT_n$ (step S12). The free-running counter 133 starts to count reference clocks from the start of motor control. Accordingly, the phase comparison value $PDT_n$ becomes a value corresponding to a time period from the start of motor control to the time when the leading edge of the pulse is detected this time.

A phase reference value $PPI_n$ is then calculated by the following equation and stored (step S13):

$$PPI_n = PPI_{(n-1)} + SPD \qquad (4)$$

where $PPI_{(n-1)}$: phase reference value stored the last time
SPD: the number of reference clocks in one period of the speed command clock (SPD is a fixed value)

Since the initial value of $PPI_{(n-1)}$ is zero, however, the phase reference value $PPI_n$ corresponding to the time when the first leading edge of the speed detection pulse is detected after the start of motor control in the above described step S11 becomes SPD.

Furthermore, the phase reference value $PPI_n$ calculated in the step S13 is 2SPD when the second leading edge of the speed detection pulse is detected, while being 3SPD when the third leading edge of the speed detection pulse is detected. That is, the phase reference value $PPI_n$ calculated in the step S13 becomes the product of SPD and the total number of speed detection pulses outputted in a time period from the start of motor control to the time when the leading edge of the speed detection pulse is detected this time. SPD is a fixed value corresponding to the period of the speed command clock. Accordingly, the phase reference value $PPI_n$ calculated in the step S13 becomes a value corresponding to a time period from the start of motor control to the time point of the leading edge of a speed command clock corresponding to the speed detection pulse whose leading edge is detected this time.

Then, the phase comparison value $PDT_n$ is subtracted from the phase reference value $PPI_n$ calculated and it is judged whether or not the difference therebetween is larger than a predetermined value "$-X$" and smaller than a predetermined value "$X$". That is, it is judged whether or not the following expression is satisfied (step S14):

$$-X \leq (PPI_n - PDT_n) \leq X \qquad (5)$$

Processing in this step S14 eliminates the possibility that significant digits of a reference clock counter or the like overflow in the subsequent calculation processing or the like to cause difficulties when the phase difference between the speed detection pulse and the speed command clock becomes larger and the difference between the phase reference value $PPI_n$ and the phase comparison value $PDT_n$ is outside the range of the predetermined values "$\pm X$".

If the expression (5) is satisfied in the step S14, a phase difference PHDT is calculated by the following equation and stored (step S15):

$$PHDT = \frac{PPI_n - PDT_n}{SPD} \qquad (6)$$

On the other hand, if the foregoing expression (5) is not satisfied in the step S14 and then, it is judged that $(PPI_n - PDT_n) < -X$ is satisfied (YES in the step S16), a phase reference value is calculated on the basis of not a speed command clock corresponding to the present speed detection pulse but the subsequent clock. That is, $PPI_{n+1} (=PPI_n + SPD)$ is calculated as a phase reference value, and a phase difference PHDT' is calculated and stored by replacing $PPI_n$ in the foregoing equation (6) with $PPI_{n+1}$ (step S17).

Furthermore, if it is judged that $(PPI_n - PDT_n) > X$ is satisfied (NO in the step S16), a phase reference value is calculated on the basis of not the speed command clock corresponding to the present speed detection pulse but the preceding clock. That is, $PPI_{n-1} (=PPI_n - SPD)$ is found as a phase reference value, and a phase difference PHDT'' is calculated and stored by replacing $PPI_n$ in the foregoing equation (6) with $PPI_{n-1}$ (Step S18).

As a result, in the step S15, the difference between a value corresponding to the time period from the start of motor control to the time when the leading edge of the speed detection pulse is detected this time (the phase comparison value $PDT_n$) and a value corresponding to the time period from the start of motor control to the time point of the leading edge of the speed command clock corresponding to the speed detection pulse whose leading edge is detected this time (the phase reference value $PPI_n$) is divided by a value (SPD) corresponding to the period of the speed command clock, thereby to find the phase difference PHDT. Accordingly, even when the phase difference between the speed command clock and the speed detection pulse is one period or more of the speed command clock, the phase difference PHDT is accurately calculated.

Furthermore, in a case where the phase difference PHDT is calculated, if the phase difference becomes larger than a predetermined value so that significant digits of the reference clock counter overflow in the subsequent calculation processing or the like, the possibility is eliminated that the phase difference PHDT calculated by the overflow of the significant digits of the counter attains an extraordinary value (steps S14, S16, S17 and S18).

The above described steps S14, S16, S17 and S18 may be omitted to make the processing simpler.

Description is now made of a method of calculating PWM data outputted from the control portion 14.

A voltage VO to be outputted to the servomotor 10 so as to cause the rotational speed N of the servomotor 10 to follow a command speed $N_0$ is expressed by the following equation when a control voltage due to the difference in speed $\Delta N\ (=N_0-N)$ is represented by V1 and a correction voltage due to the phase difference PHDT is represented by V2:

$$V0 = V1 \pm V2 \quad (7)$$

The correction voltage V2 due to the phase difference PHDT is found in the following manner when a predetermined maximum value of the correction voltage V2 is represented by $\alpha$:

(a) When the phase difference is less than one period, $(-1 < \text{PHDT} < +1)$ $$V2 = \alpha \cdot \text{PHDT} \quad (8)$$

(b) When the phase difference is one period or more and the speed detection pulse leads the speed command clock, $(\text{PHDT} < -1)$ $$V2 = -\alpha \quad (9)$$

(c) When the phase difference is one period or more and the speed detection pulse lags the speed command clock, $(\text{PHDT} \leq +1)$ $$V2 = +\alpha \quad (10)$$

Figure 6:
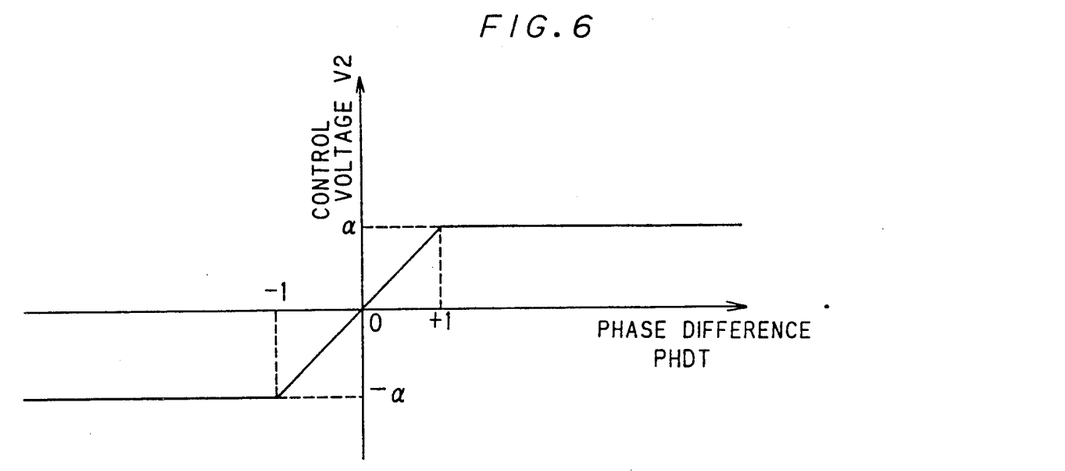
FIGS. 6 and 7 are graphs each showing the relation between a phase difference PHDT and a correction voltage V2 based on the phase difference.

Consequently, the relation between the phase difference PHDT and the correction voltage V2 is represented in FIG. 6.

Figure 7:
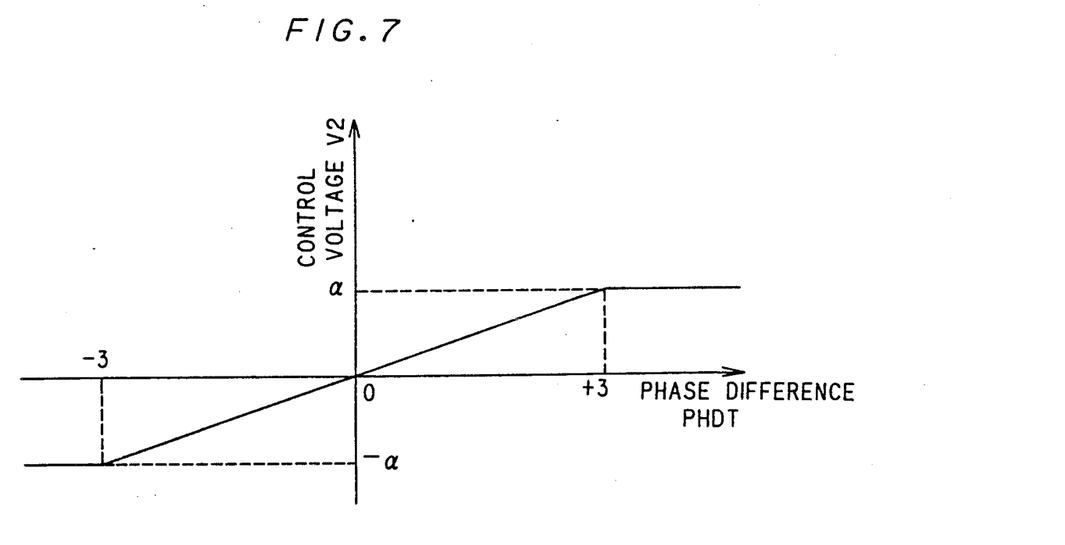

Although in the above described calculation processing of the correction voltage V2, the value of the correction voltage V2 calculated is changed depending on whether the phase difference is more or less than one period, the value of the correction voltage V2 calculated may be changed depending on whether the phase difference is more or less than an arbitrary period, for example, three periods. In such a case, the relation between the phase difference PHDT and the correction voltage V2 is represented in FIG. 7.

Furthermore, the control voltage V1 due to the difference in speed $\Delta N$ is expressed by the following equation:

$$V1 = Ra\left(\frac{GD^2}{375K_T} \cdot \frac{\Delta N}{\Delta t} + Io + \frac{T_{BL}}{K_T}\right) + keN \quad (11)$$

$$= \frac{RaGD^2}{375K_T} \cdot \frac{\Delta N}{\Delta t} + KeN + Ra(Io + T_{BL}/K_T)$$

where
  Ra: armature resistance [Ω]
  $K_T$: torque constant [kgm/A]
  Ke: induced voltage constant [V/rpm]
  Io: no-load current [A]
  $GD^2$: moment of inertia by load and motor [kgm²]
  $T_{BL}$: sliding load [kgm]

The control portion 14 detects the rotational speed N of the servomotor 10 (step S6 in FIG. 3), and calculates the voltage VO on the basis of the foregoing equations (7) to (11) every time it calculates the difference in speed $\Delta N$ from the command speed $N_0$ or it calculates the phase difference PHDT (or PHDT' or PHDT") (step S15 or S17 or S18 in FIG. 5) to output PWM data corresponding to the voltage VO. This PWM data is sent to the PWM unit 16, so that the servomotor 10 is controlled through the driver portion 11.

Figure 8:
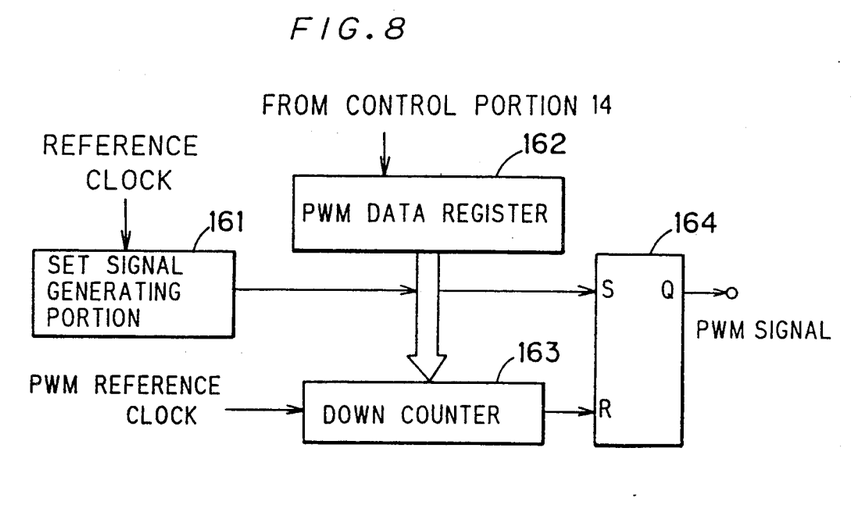
FIG. 8 is a block diagram showing the specific electrical construction of a pulse width modulation (PWM) unit.
Figure 9:
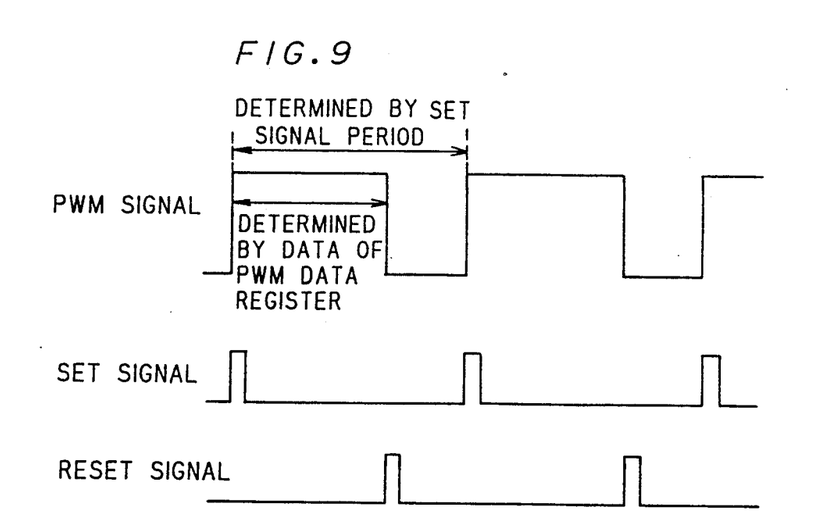
FIG. 9 is a timing chart showing the operation of the PWM unit.

FIG. 8 is a block diagram showing an example of the specific construction of the PWM unit 16, and FIG. 9 is a timing chart for explaining the operation of the PWM unit 16.

The PWM unit 16 comprises a set signal generating portion 161, a PWM data register 162, a down counter 163 and an RS flip-flop 164.

The set signal generating portion 161 generates a set signal for each constant period. This set signal generating portion 161 is constituted by, for example, a ring counter and is adapted to generate a set signal every time it counts a constant number of reference clocks.

The PWM data register 162 is used for holding PWM data applied from the control portion 14. The PWM data applied from the control portion 14 is voltage data found by the above described equation (7), that is, a voltage VO obtained by correcting the voltage V1 expressed by the equation (11) by the correction voltage V2 due to the phase difference PHDT. This PWM data is used for determining the duty of a PWM output signal outputted from the PWM unit 16.

The down counter 163 counts PWM reference clocks (in the present embodiment, the reference clocks used in the encoder signal input portion 13 and the speed command signal input portion 15 are also used as the PWM reference clocks) down every time the clocks are applied and outputs a reset signal when the set number is counted.

The operation of the PWM unit 16 is as follows. When a set signal is outputted from the set signal generating portion 161, the content of the PWM data register 162, that is, the PWM data applied from the control portion 14 is set in the down counter 163. Further, the flip-flop 164 is set by the set signal. Consequently, an output of the flip-flop 164, that is, a PWM signal attains a high level.

The down counter 163 then counts PWM reference clocks down on the basis of the clocks and applies a reset signal to the flip-flop 164 when the set counted value becomes zero. Accordingly, the output of the flip-flop 164 is changed to a low level.

As a result, the duty is determined by a value held in the PWM data register 162, that is, the voltage data calculated by the equation (7), so that the PWM signal is derived from the PWM unit 16.

The present invention is not limited to a device for controlling an optical system of an electrophotographic copying machine. For example, it is applicable to a motor for controlling a reader of a facsimile and other general motor control circuits.

Furthermore, the present invention is also applicable to a case where an applied voltage is calculated by signals other than the PWM signal.

The present invention is constructed as described above. Accordingly, even when the phase difference between the command speed and the detected speed is one period or more, the phase difference can be accurately detected, and the rotational speed of a motor can be controlled with the motor rapidly following the command speed on the basis of the phase difference accurately detected.

Additionally, when the phase difference is calculated, significant digits of a memory is prevented from overflowing in the calculation process. Accordingly, even when the phase is shifted by a predetermined time period or more, the deviation of the rotational speed of the motor can be restrained within the minimum range.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A device for controlling the rotational speed of a motor which carries out feedback control of the motor on the basis of a speed difference control value based on the difference between a command speed and rotational speed and a phase difference control value based on the phase difference between a command pulse and a detection pulse, comprising:

detection pulse output means for outputting a detection pulse proportional to the rotational speed of the motor;

command pulse output means for outputting a command pulse proportional to the command speed;

reference time point setting means for setting a reference time point;

detection pulse counting means for counting a number of detection pulses outputted;

period measuring means for measuring the period of the command pulse;

first time period calculating means for calculating a time period from the reference time point to the time when a newest detection pulse is outputted every time a predetermined number of detection pulses are counted by the detection pulse counting means;

second time period calculating means for calculating a time period from the reference time point to the time when a command pulse, which is assigned an ordinal number equal to the ordinal number of the newest detection pulse, and which corresponds to the newest detection pulse is outputted on the basis of the total number of pulses counted by the detection pulse counting means in the time period from the reference time point to the time when the newest detection pulse is outputted, and the period of the command pulse measured by the period measuring means;

phase difference calculating means for calculating the phase difference between the newest detection pulse and the command pulse corresponding thereto on the basis of the time period calculated by the first time period calculating means and the time period calculated by the second time period calculating means and the period of the command pulse; and phase difference control value output means for outputting a phase difference control value proportional to the phase difference when the phase difference calculated by the phase difference calculating means is within a predetermined range and continuing to output a control value in a critical state when the phase difference is outside the range.

2. A device for controlling the rotational speed of a motor which carries out feedback control of the motor on the basis of a speed difference control value based on the difference between a command speed and rotational speed and a phase difference control value based on the phase difference between a command pulse and a detection pulse, comprising:

detection pulse output means for outputting a detection pulse proportional to the rotational speed of the motor;

command pulse output means for outputting a command pulse proportional to the command speed;

reference time point setting means for setting a reference time point;

detection pulse counting means for counting a number of detection pulses outputted;

period measuring means for measuring the period of the command pulse;

first time period calculating means for calculating a time period from the reference time point to the time when a newest detection pulse is outputted every time a predetermined number of detection pulses are counted by the detection pulse counting means;

second time period calculating means for calculating a time period from the reference time point to the time when a command pulse, which is assigned an ordinal number equal to the ordinal number of the newest detection pulse, and which corresponds the newest detection pulse is outputted on the basis of the total number of pulses counted by the detection pulse counting means from the reference time point to the time when the newest detection pulse is outputted and the period of the command pulse measured by the period measuring means;

first phase difference calculating means for calculating the phase difference between the newest detection pulse and the command pulse corresponding thereto on the basis of the time period calculated by the first time period calculating means, the time period calculated by the second time period calculating means and the period of the command pulse;

state discriminating means for discriminating among a first state where the phase difference calculated by the first phase difference calculating means is within one period of the command pulse, a second state where the newest detection pulse lags the corresponding command pulse by a phase difference of a predetermined time period or more which is larger than one period of the command pulse, and a third state where the newest detection pulse leads the corresponding command pulse by a phase difference of a predetermined time period or more which is larger than one period of the command pulse;

first phase difference control value output means responsive to the discrimination of the first state by the state discriminating means for outputting a phase difference control value on the basis of the value of the phase difference calculated by the first phase difference calculating means;

third time period calculating means responsive to the discrimination of the second state by the state discriminating means for calculating a time period from the reference time point to the time when a command pulse preceding the command pulse corresponding to the newest detection pulse is outputted on the basis of the number obtained by subtracting one from the total number of pulses counted by the detection pulse counting means in the time period from the reference time point to the time when the newest detection pulse is outputted and the period of the command pulse measured by the period measuring means;

fourth time period calculating means responsive to the discrimination of the third state by the state discriminating means for calculating a time period from the reference time point to the time when a command pulse subsequent to the command pulse corresponding to the newest detection pulse is outputted on the basis of the number obtained by adding to 1 the total number of pulses counted by the detection pulse counting means in the time period from the reference time point to the time when the newest detection pulse is outputted and the period of the command pulse measured by the period measuring means;

second phase difference calculating means responsive to the calculation of the time period by the third time period calculating means for calculating the phase difference between the newest detection pulse and the command pulse preceding the command pulse corresponding to the newest detection pulse on the basis of the time period calculated by the third time period calculating means, the time period calculated by the first time period calculating means and the period of the command pulse;

second phase difference control value output means for outputting a phase difference control value on the basis of the value of the phase difference calculated by the second phase difference calculating means;

third phase difference calculating means responsive to the calculation of the time period by the fourth time period calculating means for calculating the phase difference between the newest detection pulse and the command pulse subsequent to the command pulse corresponding to the newest detection pulse on the basis of the time period calculated by the fourth time period calculating means, the time period calculated by the first time period calculating means and the period of the command pulse; and third phase difference control value output means for outputting a phase difference control value on the basis of the value of the phase difference calculated by the third phase difference calculating means.

3. A method of calculating the phase difference between a speed command pulse and a speed detection pulse which is required to carry out feedback control of a motor, comprising the steps of:

preparing detection pulse output means for outputting a detection pulse proportional to the rotational speed of the motor, command pulse output means for outputting a command pulse proportional to a command speed, reference time point setting means for setting a reference time point, detection pulse counting means for counting a number of detection pulses outputted, and period measuring means for measuring the period of the command pulse;

calculating a first time period from the reference time point to the time when a newest detection pulse is outputted every time a predetermined number of detection pulses are counted by the detection pulse counting means;

calculating a second time period from the reference time point to the time when a command pulse, which is assigned an ordinal number equal to the ordinal number of the newest detection pulse, and which corresponds to the newest detection pulse is outputted on the basis of the total number of pulses counted by the detection pulse counting means in the time period from the reference time point to the time when the newest detection pulse is outputted, and the period of the command pulse measured by the period measuring means; and calculating the phase difference between the newest detection pulse and the command pulse corresponding thereto on the basis of the first time period and the second time period calculated and the period of the command pulse.

* * * * *